June 11, 1929.  H. C. BOARDMAN  1,716,947
STORAGE TANK FOR VOLATILE LIQUIDS
Filed Dec. 21, 1927  2 Sheets-Sheet 1
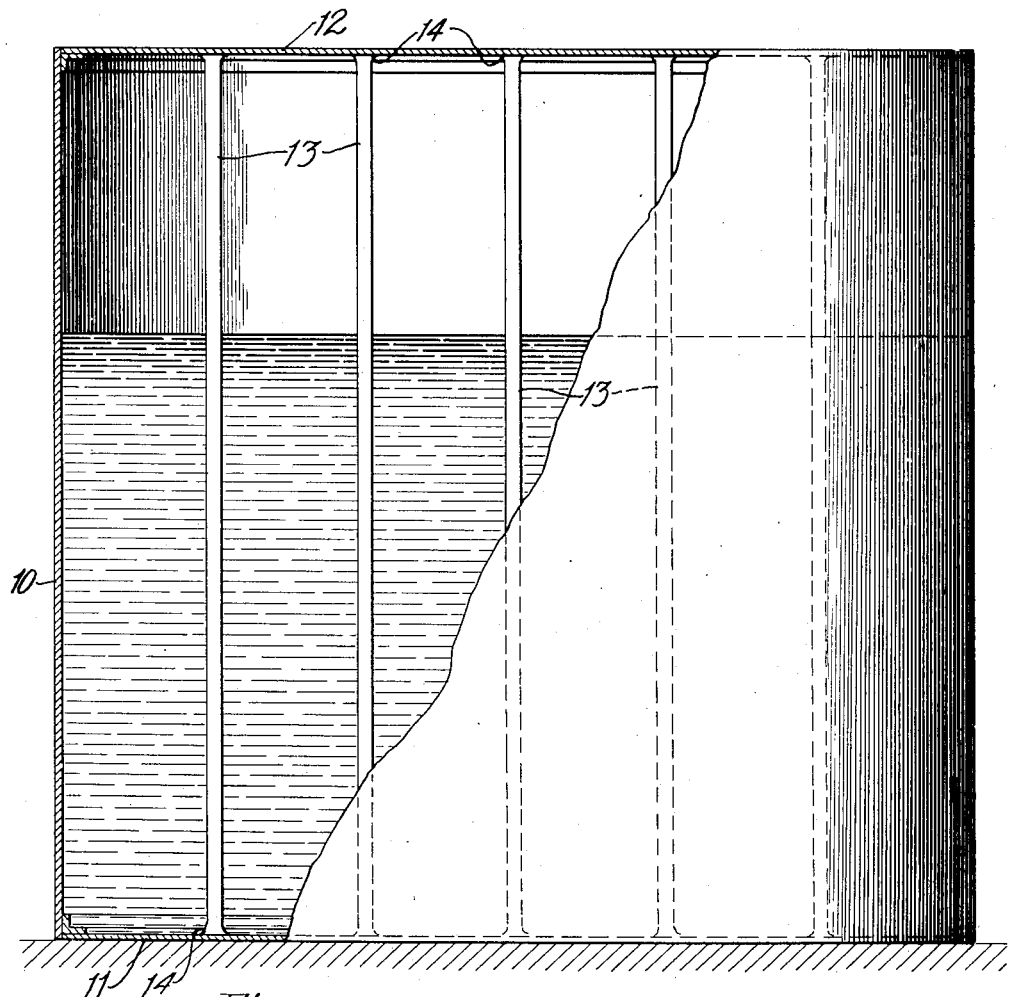
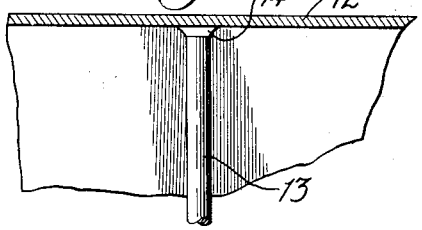
Inventor:
Harry C. Boardman,
By Dynforth, Lee, Chritton & Wiles
Attys.

June 11, 1929. H. C. BOARDMAN 1,716,947
STORAGE TANK FOR VOLATILE LIQUIDS
Filed Dec. 21, 1927 2 Sheets-Sheet 2
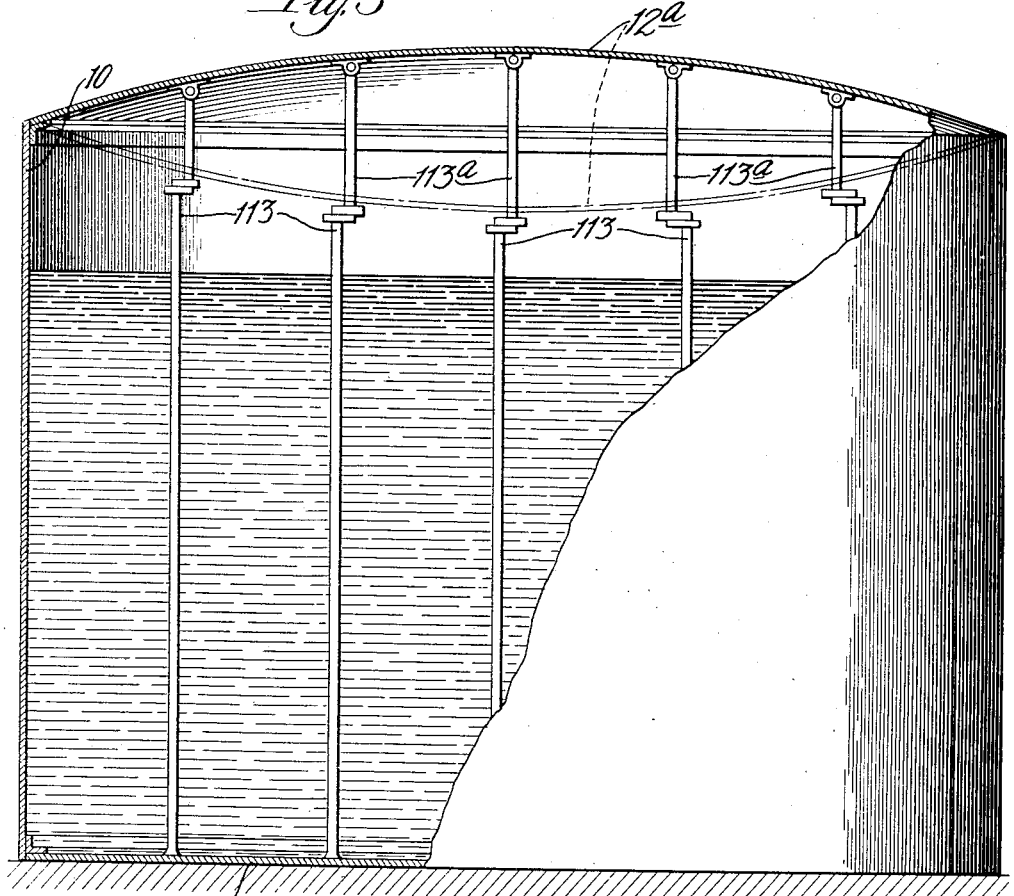
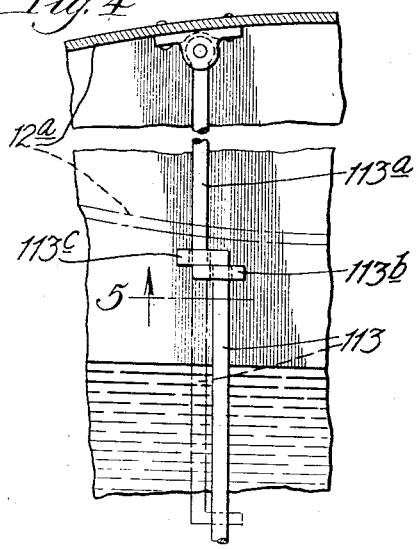
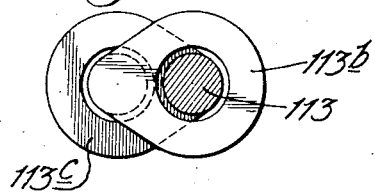
Inventor:
Harry C. Boardman,
By Dynrenforth, Lee, Chritton & Wiles,
Attys.

Patented June 11, 1929.

1,716,947

UNITED STATES PATENT OFFICE.

HARRY C. BOARDMAN, OF CHICAGO, ILLINOIS, ASSIGNOR TO CHICAGO BRIDGE & IRON CO., A CORPORATION OF ILLINOIS.

STORAGE TANK FOR VOLATILE LIQUIDS.

Application filed December 21, 1927. Serial No. 241,570.

This invention relates to improvements in storage tanks for volatile liquids, and more especially to such a tank adapted to hold such liquids together with a certain amount of internal gas pressure.

The invention is especially applicable to tanks of the character described having flat or flattened roofs, such tanks must be provided with means for bracing the roof against the internal gas pressure.

One of the features of my invention is the provision of means for so bracing a flat or flattened roof.

The invention may be used in connection with a tank having a stationary roof or a so-called "breather" roof.

Other features and advantages of my invention will appear more fully as I proceed with my specification.

In those forms of devices showing my invention in the accompanying drawings, Fig. 1 is a view partly in vertical section and partly in side elevation, Fig. 2 is an enlarged fragmentary view showing one form of attaching one of the tension members to the roof, Fig. 3 is a view similar to Fig. 1 showing the invention embodied in a tank of the breather type, Fig. 4 is an enlarged fragmentary view showing the telescopic connection of one of the tension rods in the tank shown in Fig. 3, and Fig. 5 is a view taken as indicated by the line 5 of Fig. 4.

As shown in the drawings, in Fig. 1, the blank comprises the ordinary cylindrical wall or shell 10 with a flat bottom 11. 12 indicates a flat roof for the tank.

Since the tank is designed to hold a volatile liquid with gas pressure there must be some means to prevent the roof 12 from being bulged upwardly by the gas pressure. I accomplish this by providing tension members 13, 13 between the roof and the bottom. These tension members are fastened at their ends to the roof and the bottom in any suitable manner, as, for example, by means of a weld as indicated by 14 in Fig. 2.

In Fig. 3 I have shown a tank with a breather roof. That is, the roof as indicated by $12^a$ is fastened at its edge to the wall of the tank 10 but it is bulged so that it is free to move upwardly and downwardly in accordance with changes in the pressure or volume of the gas inside. This roof is what is known as the "breather" type. With a roof of this kind I provide telescopic tension members 113 each having an upper portion $113^a$ telescopically attached as shown in the drawings. This is accomplished by providing the lower end of the part $113^a$ with a loop $113^b$ embracing the upper end of the rod 113 which likewise is provided with a loop $113^c$ embracing the lower end of the rod $113^a$. By means of this telescoping connection, the roof is free to move downwardly by telescoping the tension members. It is limited in its upward movement, however, because the members are so adjusted that when the roof reaches its maximum height the loops on the rod will engage it, as shown in Figs. 3 and 4, thus preventing further upward movement of the roof.

While I have shown and described certain embodiments of my invention, it is to be understood that it is capable of many modifications. Changes, therefore, in the construction and arrangement may be made without departing from the spirit and scope of the invention disclosed in the appended claim, in which it is my intention to claim all novelty in my invention as broadly as possible in view of the prior art.

What I claim is new, and desire to secure by Letters Patent, is:

In a storage tank with a "breather" roof of the character shown, telescopic tension members between the roof and the bottom of the tank, said tension members adapted to expand and contract with the breathing movement of the roof, the limit of expansion of said members being reached upon the roof reaching its maximum height.

In witness whereof, I have hereunto set my hand this 12th day of December, 1927.

HARRY C. BOARDMAN.